United States Patent
Beigi et al.

(10) Patent No.: US 6,748,356 B1
(45) Date of Patent: Jun. 8, 2004

(54) METHODS AND APPARATUS FOR IDENTIFYING UNKNOWN SPEAKERS USING A HIERARCHICAL TREE STRUCTURE

(75) Inventors: Homayoon Sadr Mohammad Beigi, Yorktown Heights, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 09/588,846

(22) Filed: Jun. 7, 2000

(51) Int. Cl.[7] .......................... G10L 15/04; G10L 15/06

(52) U.S. Cl. .................. 704/245; 704/248; 704/250

(58) Field of Search ............................... 704/243, 244, 704/245, 246, 248, 249, 250

(56) References Cited

U.S. PATENT DOCUMENTS

| | | | |
|---|---|---|---|
| 5,659,662 A | | 8/1997 | Wilcox et al. |
| 6,345,252 B1 | * | 2/2002 | Beigi et al. .................. 704/272 |
| 6,421,645 B1 | * | 7/2002 | Beigi et al. .................. 704/272 |
| 6,424,946 B1 | * | 7/2002 | Tritschler et al. ........... 704/272 |
| 6,684,186 B2 | * | 1/2004 | Beigi et al. .................. 704/246 |

OTHER PUBLICATIONS

S. Dharanipragada et al., "Experimental Results in Audio Indexing," Proc. ARPA SLT Workshop, (Feb. 1996).

L. Polymenakos et al., "Transcription of Broadcast News—Some Recent Improvements to IBM's LVCSR System," Proc. ARPA SLT Workshop, (Feb. 1996).

R. Bakis, "Transcription of Broadcast News Shows with the IBM Large Vocabulary Speech Recognition System," Proc. ICASSP98, Seattle, WA (1998).

H. Beigi et al., "A Distance Measure Between Collections of Distributions and its Application to Speaker Recognition" Proc. ICASSP98, Seattle, WA (1998).

S. Chen, "Speaker, Environment and Channel Change Detection and Clustering via the Bayesian Information Criterion," Proceedings of the Speech Recognition Workshop (1998).

(List continued on next page.)

*Primary Examiner*—Richemond Dorvil
*Assistant Examiner*—Martin Lerner
(74) *Attorney, Agent, or Firm*—Ryan, Mason & Lewis, LLP; Thu Ann Dang, Esq.

(57) ABSTRACT

A method and apparatus are disclosed for identifying speakers participating in an audio-video source, whether or not such speakers have been previously registered or enrolled. A speaker segmentation system separates the speakers and identifies all possible frames where there is a segment boundary between non-homogeneous speech portions. A hierarchical speaker tree clustering system clusters homogeneous segments (generally corresponding to the same speaker), and assigns a cluster identifier to each detected segment, whether or not the actual name of the speaker is known. A hierarchical enrolled speaker database is used that includes one or more background models for unenrolled speakers to assign a speaker to each identified segment. Once speech segments are identified by the segmentation system, the disclosed unknown speaker identification system compares the segment utterances to the enrolled speaker database using a hierarchical approach and finds the "closest" speaker, if any, to assign a speaker label to each identified segment. A speech segment having an unknown speaker is initially assigned a general speaker label from a set of background models for speaker identification, such as "unenrolled male" or "unenrolled female." The "unenrolled" segment is assigned a cluster identifier and is positioned in the hierarchical tree. Thus, the hierarchical speaker tree clustering system assigns a unique cluster identifier corresponding to a given node, for each speaker to further differentiate the general speaker labels.

20 Claims, 10 Drawing Sheets

OTHER PUBLICATIONS

S. Chen et al., "Clustering via the Bayesian Information Criterion with Applications in Speech Recognition," Proc. ICASSP98, Seattle, WA (1998).

S. Chen et al., "IBM's LVCSR System for Transcription of Broadcast News Used in the 1997 Hub4 English Evaluation," Proceedings of the Speech Recognition Workshop (1998).

S. Dharanipragada et al., "A Fast Vocabulary Independent Algorithm for Spotting Words in Speech," Proc. ICASSP98, Seattle, WA (1998).

J. Navratil et al., "An Efficient Phonotactic–Acoustic system for Language Identification," Proc. ICASSP98, Seattle, WA (1998).

G. N. Ramaswamy et al., "Compression of Acoustic Features for Speech Recognition in Network Environments," Proc. ICASSP98, Seattle, WA (1998).

S. Chen et al., "Recent Improvements to IBM's Speech Recognition System for Automatic Transcription of Broadcast News," Proceedings of the Speech Recognition Workshop (1999).

S. Dharanipragada et al., "Story Segmentation and Topic Detection in the Broadcast News Domain," Proceedings of the Speech Recognition Workshop (1999).

C. Neti et al., "Audio–Visual Speaker Recognition for Video Broadcast News," Proceedings of the Speech Recognition Workshop (1999).

\* cited by examiner

FIG. 2

TIME-STAMPED WORD DATABASE (200)

| | WORD STRING (220) | START TIME (230) | WORD DURATION (240) |
|---|---|---|---|
| 211 | 1 | $t_1$ | |
| 212 | 2 | $t_2$ | |
| 213 | ⋮ | ⋮ | ⋮ |
| 214 | N | $t_N$ | |

FIG. 3

SPEAKER TURN DATABASE (300)

| | SEGMENT NUMBER (320) | START TIME (330) | SPEAKER LABEL (BEST GUESS) (340) | SCORE (350) | CLUSTER IDENTIFIER (360) |
|---|---|---|---|---|---|
| 304 | 1 | $T_A$ | UNENROLLED MALE | $S_{10}$ | $C_1$ |
| 305 | 2 | $T_B$ | SPEAKER X | $S_{11}$ | $C_4$ |
| 306 | 3 | $T_K$ | UNENROLLED MALE | $S_{12}$ | $C_7$ |
| 307 | ⋮ | ⋮ | ⋮ | ⋮ | ⋮ |
| 308 | N | $T_N$ | SPEAKER X | $S_{1N}$ | $C_4$ |

FIG. 8A

|  | Speaker Model B | | | | | |
|---|---|---|---|---|---|---|
|  | $B_1$ | $B_2$ | $B_3$ | $\cdots$ | $B_N$ | |
| Speaker Model A | | | | | | Weighted Row Minima |
| $A_1$ | $d11$ | $d12$ | $d13$ | $\cdots$ | $d1N$ | $W^A_1$ |
| $A_2$ | $d21$ | $d22$ | $d23$ | $\cdots$ | $d2N$ | $W^A_2$ |
| $A_3$ | $d31$ | $d32$ | $d33$ | $\cdots$ | $d3N$ | $W^A_3$ |
| $\vdots$ | $\vdots$ | $\vdots$ | $\vdots$ | $\vdots$ | $\vdots$ | $\vdots$ |
| $A_M$ | $dM1$ | $dM2$ | $dM3$ | $\cdots$ | $dMN$ | $W^A_M$ |

FIG. 8B

|  | Speaker Model B | | | | |
|---|---|---|---|---|---|
|  | $B_1$ | $B_2$ | $B_3$ | $\cdots$ | $B_N$ |
| Speaker Model A | | | | | |
| $A_1$ | $d11'$ | $d12'$ | $d13'$ | $\cdots$ | $d1N'$ |
| $A_2$ | $d21'$ | $d22'$ | $d23'$ | $\cdots$ | $d2N'$ |
| $A_3$ | $d31'$ | $d32'$ | $d33'$ | $\cdots$ | $d3N'$ |
| $\vdots$ | $\vdots$ | $\vdots$ | $\vdots$ | $\vdots$ | $\vdots$ |
| $A_M$ | $dM1'$ | $dM2'$ | $dM3'$ | $\cdots$ | $dMN'$ |
| Weighted Column Minima | $W^B_1$ | $W^B_2$ | $W^B_3$ | $\cdots$ | $W^B_N$ |

MERGING MODELS $g, h$ : GAUSSIAN $\{\mu, \Sigma\}$ OR $\{S_x, S_x^2\}$

METHODS AND APPARATUS FOR IDENTIFYING UNKNOWN SPEAKERS USING A HIERARCHICAL TREE STRUCTURE

CROSS-REFERENCE TO RELATED APPLICATIONS

This application is related to U.S. patent application Ser. No. 09/434,604, filed Nov. 5, 1999, now U.S. Pat. No. 6,424,946 issued Jul. 23, 2002, U.S. patent application Ser. No. 09/345,237, filed Jun. 30, 1999, now U.S. Pat. No. 6,421,645 issued Jul. 16, 2002, and U.S. patent application Ser. No. 09/288,724, filed Apr. 9, 1999, now U.S. Pat. No. 6,345,252 issued Feb. 5, 2002, each assigned to the assignee of the present invention and incorporated by reference herein.

FIELD OF THE INVENTION

The present invention relates generally to audio information classification systems and, more particularly, to methods and apparatus for identifying speakers in an audio file.

BACKGROUND OF THE INVENTION

Many organizations, such as broadcast news organizations and information retrieval services, must process large amounts of audio information, for storage and retrieval purposes. Frequently, the audio information must be classified by subject or speaker name, or both. In order to classify audio information by subject, a speech recognition system initially transcribes the audio information into text for automated classification or indexing. Thereafter, the index can be used to perform query-document matching to return relevant documents to the user.

Thus, the process of classifying audio information by subject has essentially become fully automated. The process of classifying audio information by speaker, however, often remains a labor intensive task, especially for real-time applications, such as broadcast news. While a number of computationally-intensive off-line techniques have been proposed for automatically identifying a speaker from an audio source using speaker enrollment information, the speaker classification process is most often performed by a human operator who identifies each speaker change, and provides a corresponding speaker identification.

A number of techniques have been proposed or suggested for identifying speakers in an audio stream, including U.S. patent application Ser. No. 09/434,604, filed Nov. 5, 1999, U.S. patent application Ser. No. 09/345,237, filed Jun. 30, 1999, and U.S. patent application Ser. No. 09/288,724, filed Apr. 9, 1999, each assigned to the assignee of the present invention. U.S. patent application Ser. No. 09/345,237, for example, discloses a method and apparatus for automatically transcribing audio information from an audio source while concurrently identifying speakers in real-time, using an existing enrolled speaker database. U.S. patent application Ser. No. 09/345,237, however, can only identify the set of the speakers in the enrolled speaker database. In addition, U.S. patent application Ser. No. 09/345,237 does not allow new speakers to be added to the enrolled speaker database while audio information is being processed in real-time. A need therefore exists for a method and apparatus that automatically identifies unknown speakers in real-time or in an off-line manner. A further need exists for a method and apparatus that automatically identifies unknown speakers using a hierarchical speaker model tree.

SUMMARY OF THE INVENTION

Generally, a method and apparatus are disclosed for identifying speakers participating in an audio-video source, whether or not such speakers have been previously registered or enrolled. A speaker segmentation system separates the speakers and identifies all possible frames where there is a segment boundary between non-homogeneous speech portions. The hierarchical speaker tree clustering system clusters homogeneous segments (generally corresponding to the same speaker), and assigns a cluster identifier to each detected segment, whether or not the actual name of the speaker is known. Thus, segments corresponding to the same speaker should have the same cluster identifier.

According to one aspect of the invention, the disclosed speaker identification system uses a hierarchical enrolled speaker database that includes one or more background models for unenrolled speakers to assign a speaker to each identified segment. Once the speech segments are identified by the segmentation system, the disclosed unknown speaker identification system compares the segment utterances to the enrolled speaker database using a hierarchical approach and finds the "closest" speaker, if any, to assign a speaker label to each identified segment.

A speech segment having an unknown speaker is initially assigned a general speaker label from a set of background models for speaker identification, such as "unenrolled male" or "unenrolled female." The "unenrolled" segment is assigned a cluster identifier and is positioned in the hierarchical tree. Thus, the hierarchical speaker tree clustering system assigns a unique cluster identifier corresponding to a given node, for each speaker to further differentiate the general speaker labels.

A more complete understanding of the present invention, as well as further features and advantages of the present invention, will be obtained by reference to the following detailed description and drawings.

BRIEF DESCRIPTION OF THE DRAWINGS

FIG. 2 is a table from the time-stamped word database of FIG. 1;

FIG. 3 is a table from the speaker turn database of FIG. 1;

FIGS. 8A and 8B illustrate a technique for measuring distance between speaker models;

DETAILED DESCRIPTION OF PREFERRED EMBODIMENTS

Figure 1:
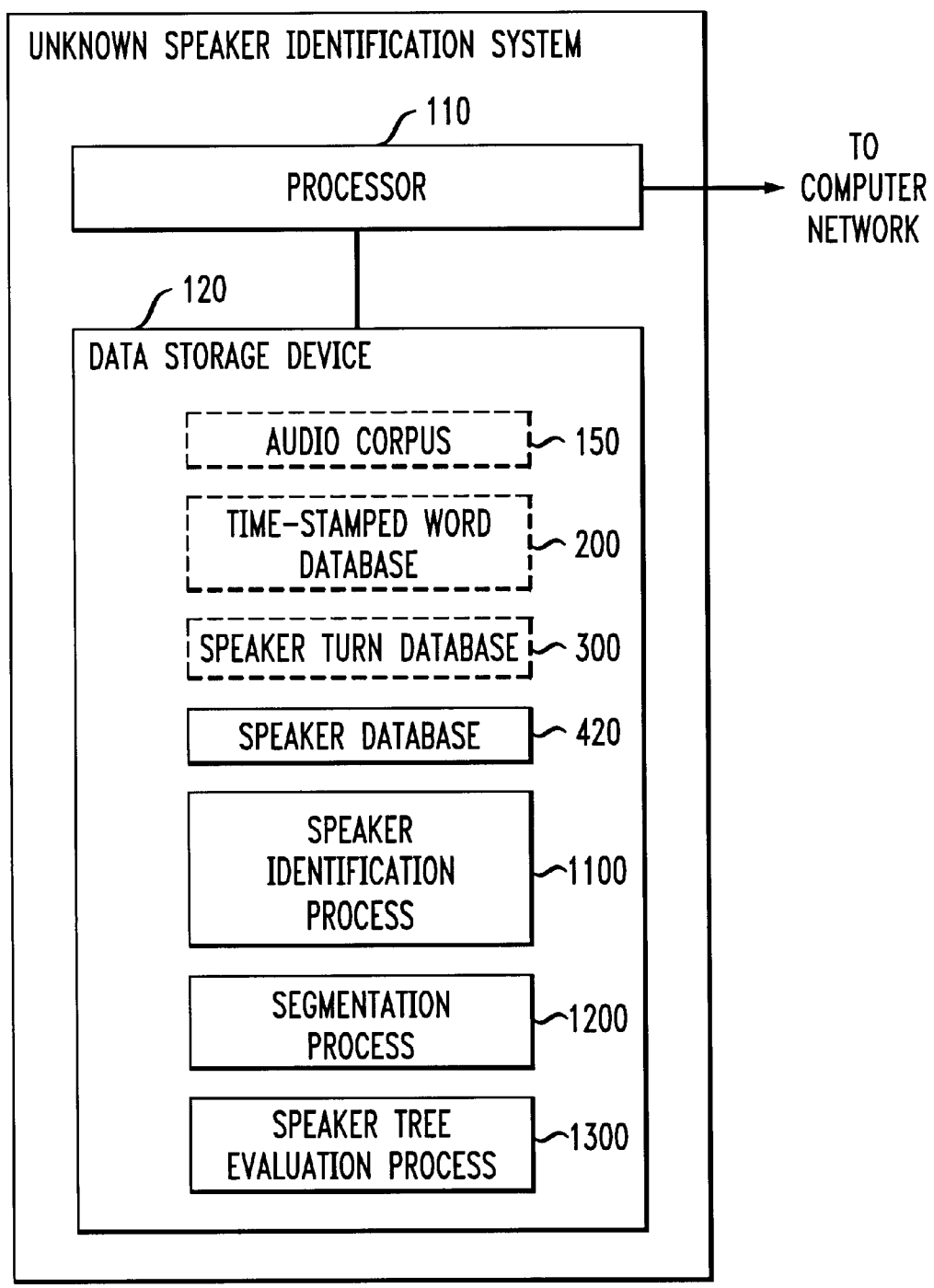
FIG. 1 is a block diagram of an unknown speaker classification; system according to the present invention.

FIG. 1 illustrates an unknown speaker classification system 100 in accordance with the present invention that automatically transcribes audio information from an audio-video source and identifies speakers participating in the audio-video source, whether or not such speakers have been previously registered or enrolled. The audio-video source file may be, for example, an audio recording or live feed, for example, from a broadcast news program. The audio-video source is initially transcribed and concurrently processed to identify all possible frames where there is a segment boundary, indicating a speaker change. The unknown speaker classification system 100 includes a speaker segmentation system that separates the speakers and identifies all possible frames where there is a segment boundary. A segment is a continuous portion of the audio source associated with a given speaker.

The present invention classifies segments in a live (or prerecorded) audio stream by identifying and labeling individual speakers as they are speaking. A label is applied by comparison with a previously known speaker. Speakers are registered or enrolled using a speech sample. When the audio stream is processed, each audio segment is extracted using a speaker segmentation algorithm and then compared against the enrolled speakers in the database. The speaker identification process can be performed in real-time while the audio is streaming, and concurrent with the segmentation process.

In accordance with one feature of the present invention, the user may be prompted for the identity of an unknown speaker associated with a given audio segment in real-time as the audio is presented, or the user may be prompted for the identity of an unknown speaker associated with a given cluster (collection of audio segments with sufficiently similar characteristics) in an off-line manner. In addition, the speaker name provided by the user can be used to update the enrolled speaker database. In one implementation of the present invention, a user interface presents the user with the current cluster number, and prompts the user to enter the name of the speaker.

As discussed further below, once the user assigns a speaker label to an audio segment having an unknown speaker in a real-time implementation, the present invention will automatically assign the same speaker name to any subsequent segments (as well as previously unassigned segments) that are assigned to the same cluster. Likewise, once the user assigns a speaker label to a cluster having an unknown speaker in an off-line implementation, the present invention will automatically assign the speaker name to all segments associated with the cluster.

According to one feature of the present invention, a segment having an unknown speaker is initially assigned a general speaker label from a set of background models for speaker identification, such as "unenrolled male" or "unenrolled female." In the illustrative implementation, voice samples from several speakers are used to generate one collective model. Thus, the background models are the minimum required speaker names in the enrolled speaker database. When an "unenrolled speaker" label is produced by the speaker identification system, then the segment belongs to a speaker without a distinct identity. The "unenrolled" segment is assigned a segment number and receives a cluster identifier. Thus, according to another feature of the present invention, the hierarchical speaker tree clustering module, discussed below, sub-classifies the unknown speaker into his or her own unique cluster. The hierarchical speaker tree clustering module automatically stores the audio file in terms of groups of segments associated with a given cluster. For example, each speech segment can have an associated cluster or tree node number. Thus, the clustering module serves to further differentiate each of the speakers that have been assigned the general label from the background model.

FIG. 1 is a block diagram showing the architecture of an illustrative unknown speaker classification system 100 in accordance with the present invention. The unknown speaker classification system 100 may be embodied as a general purpose computing system, such as the general purpose computing system shown in FIG. 1. The unknown speaker classification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio corpus database 150 for storing one or more prerecorded or live audio or video files (or both) that can be processed in real-time or off-line in accordance with the present invention. The data storage device 120 also optionally includes a time-stamped word database 200, discussed further below in conjunction with FIG. 2, that can optionally be produced by the speech recognition system and includes a set of time-stamped words. In addition, a speaker turn database 300, discussed further below in conjunction with FIG. 3, is optionally produced by the speaker identification system, in conjunction with the speaker segmentation system, and indicates the start time of each segment, together with one or more corresponding suggested speaker labels (including labels from the selection of background models, such as "unenrolled female"), as well as a cluster identifier. The speaker database 420 is produced by a speaker enrollment process 410, discussed below in conjunction with FIG. 4, and includes an entry for each enrolled speaker. In addition, in accordance with the present invention, the enrolled speaker database 420 includes the background models for unenrolled speakers. It is noted that the generated databases 200 and 300 shown in the illustrative embodiment of FIG. 1 may not be required for an online implementation where the results of the present invention are displayed to a user in real-time, and are not required for subsequent access.

In addition, as discussed further below in conjunction with FIGS. 11 through 13, the data storage device 120 includes a speaker identification process 1100, a segmentation process 1200 and a speaker tree evaluation process 1300. The speaker identification process 1100 analyzes one or more audio files in the audio corpus database 150 and produces a transcription of the audio information in real-time, indicating the speaker associated with each segment, if known. In the event a background model label is assigned to a given speech segment, the user can be prompted for the name of the corresponding speaker. The segmentation process 1200 separates the speakers and identifies all possible frames where there is a segment boundary. The speaker tree evaluation process 1300 compares a given speech segment to the hierarchical speaker tree 420 and identifies the closest node.

FIG. 2 illustrates an exemplary time-stamped word database 200 that is produced by the speech recognition system and includes a set of time-stamped words. The time-stamped word database 200 maintains a plurality of records, such as records 211 through 214, each associated with a different word in the illustrative embodiment. For each word identified in field 220, the time-stamped word database 200 indicates the start time of the word in field 230.

FIG. 3 illustrates an exemplary speaker turn database 300 that is produced by the speaker identification system, in conjunction with the speaker segmentation system, and indicates the start time of each segment, together with one or more corresponding suggested speaker labels (including labels from the selection of background models, such as "unenrolled female"), as well as a cluster identifier. The speaker turn database 300 maintains a plurality of records, such as records 304 through 308, each associated with a different segment in the illustrative embodiment. For each segment identified by a segment number in field 320, the speaker turn database 300 indicates the start time of the segment in field 330, relative to the start time of the audio source file. In addition, the speaker turn database 300 identifies the speaker (including labels from the selection of background models, such as "unenrolled female") associated with each segment in field 340, together with the corresponding speaker score in field 350. Finally, the speaker turn database 300 identifies the cluster identifier that has been assigned to the segment in accordance with the BIC criterion, in a manner discussed further below.

Speaker Registration Process

Figure 4:
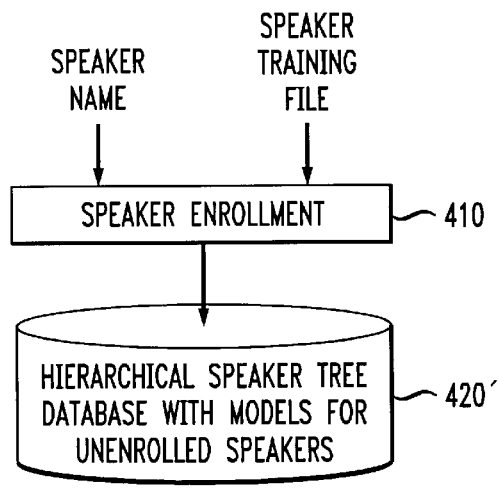
FIG. 4 illustrates a representative speaker enrollment process in accordance with the present invention.

FIG. 4 illustrates a process used to register or enroll speakers. As previously indicated, the present invention supplements the enrolled speaker information with background models for unenrolled speakers. As shown in FIG. 4, for each registered speaker, the name of the speaker is provided to a speaker enrollment process 410, together with a speaker training file, such as a pulse-code modulated (PCM) file. The speaker enrollment process 410 analyzes the speaker training file, and creates an entry for each speaker in a speaker database 420. As previously indicated, the speaker database 420 includes models for unenrolled speakers, such as "unenrolled male" and "unenrolled female." The process of adding speaker's voice samples to the speaker database 420 is called enrollment. The initial enrollment process is off-line. About a minute's worth of audio is generally required from each speaker from multiple channels and microphones encompassing multiple acoustic conditions. The training data or database of enrolled and unenrolled speakers is stored using a hierarchical structure so that accessing the models is optimized for efficient recognition and retrieval.

The process for creating the hierarchical structure of enrolled speakers 420 is discussed below in conjunction with FIGS. 5 through 10. Generally, the basic speakers models are stored in a hierarchical structure (tree). The speaker models are created from sample audio streams for each speaker. As indicated above, one or more background models are also provided for unknown speakers.

Figure 5:
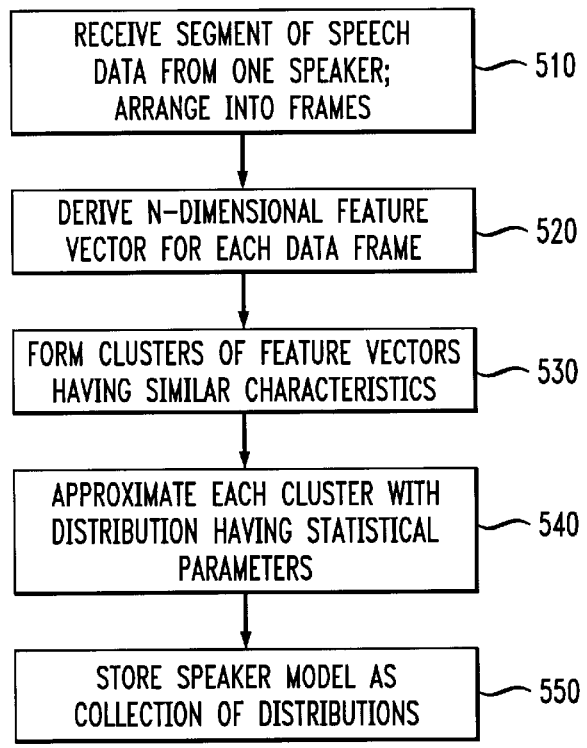
FIG. 5 is a flow diagram of an illustrative software routine for deriving a speaker model from a speech segment.

FIG. 5 is a flow chart describing a software routine for implementing part of an exemplary method of the present invention is shown. The process shown in FIG. 5 is performed for a number of speech segments, each obtained from a different speaker, so as to develop a corresponding number of speaker models. The speaker model may be merged with speaker models from similar speakers to form a speaker model tree in a hierarchical fashion as will be described in detail later.

As shown in FIG. 5, a segment of speech data is initially received: from a single speaker during step 510, is broken down into frames, typically 10–20 ms long and is digitally stored by a suitable recording system during step 510. Thereafter, spectral components corresponding to each frame are derived during step 520 and an N-dimensional feature vector such as a Mel-Warped Cepstral feature vector is defined for each frame. The feature vector is composed of N quantized spectral components of generally equal spectral ranges. Methods for computing Mel-Warped Cepstral feature vectors are known in the art. For a discussion of a suitable method for computing cepstral feature vectors, see, for example, L. Rabiner and B. H. Juang, Fundamentals of Speech Recognition, Prentice Hall Signal Processing Series, Alan V. Oppenheim, Series Ed., New Jersey, 1993, 125–128, incorporated by reference herein. In alternate embodiments, alternatives to Cepstral feature vectors may be utilized, including fast fourier transform (FFT) based feature vectors, feature vectors based on the first or second derivatives of Cepstral parameters, or linear predictive coefficients (LPC).

The way the spectral energy of each feature vector is apportioned among the spectral components is, of course, dependent upon the audio characteristics of the corresponding frame. Generally, feature vectors for audio frames with similar characteristics will likewise be similar. Hence, audio frames representing common phonemes of the same speaker will result in similar feature vectors for those frames.

With a feature vector thus established for each frame, step 530 groups feature vectors with similar characteristics into clusters. In general, similarity among feature vectors is determined by comparing, for a given feature vector, the energy level of each spectral component thereof to the energy levels of corresponding spectral components of other feature vectors. Feature vectors with small differences in energy levels averaged over the whole spectrum under consideration are grouped together to form part of a cluster.

Each cluster is then approximated during step 540 by a Gaussian or other centralized distribution, which is stored in terms of its statistical parameters such as the mean vector, the covariance matrix and the number of counts (samples in the cluster). A speaker model is then defined and stored during step 550 as a collection of the distributions corresponding to the respective clusters. Accordingly, once the statistical parameters are computed for the clusters, the feature vectors need not be carried around for subsequent distance calculations among clusters. Consequently, this approach is not as computationally intensive as one that uses the actual feature vectors to perform such comparisons.

One way to perform the cluster formation of step 550 is to employ a bottom-up clustering technique in which all the feature vectors are first arranged in a stream. A predetermined number of cluster centers in the stream are then randomly picked. Next, the K-Means algorithm as described in Fundamentals of Speech Recognition, supra, is implemented to come up with new cluster centers in an iterative fashion. Eventually, after the convergence of the K-Means algorithm, the predetermined number of N-dimensional vectors of means and their corresponding variances are available. The variance vector is also N-dimensional since a diagonal covariance matrix is assumed.

Figure 6:
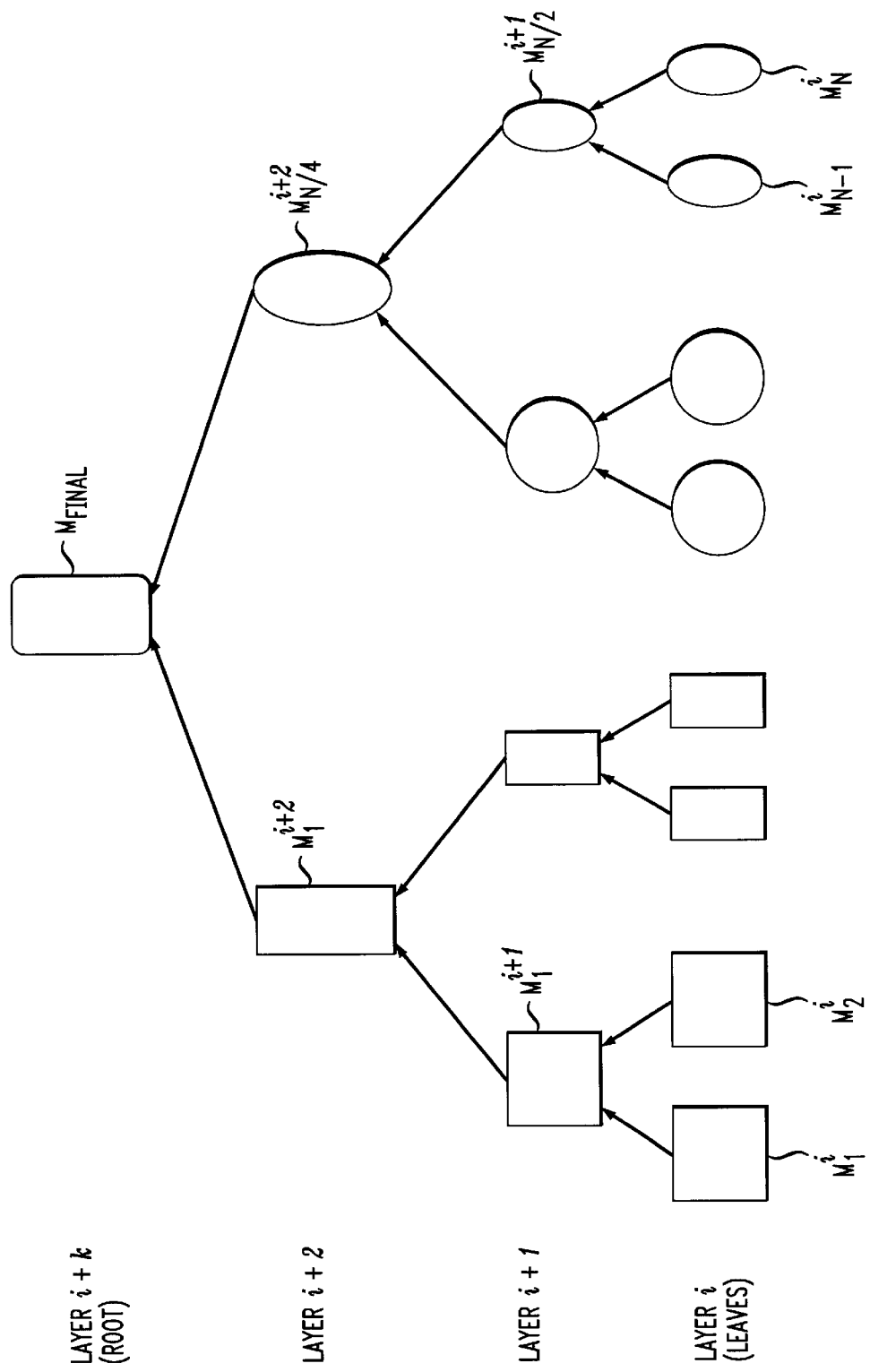
FIG. 6 is a diagram of a speaker model tree developed in accordance with the invention.

FIG. 6 illustrates a speaker model tree building process in accordance with the invention. As shown in FIG. 6, the process starts with N base speaker models $M_1^i$ to $M_N^i$ in the bottommost layer i. These base models in the bottommost layer will be referred to as the leaves of the tree. Each model in layer i contains a collection of distributions derived from one speaker as described above in connection with FIG. 5. A software routine is carried out to perform a distance measure among the speaker models in layer i to determine, for each speaker model, which of the other models is the most similar thereto (i.e., which has the shortest distance to the model under consideration). In this manner, pairs of similar speaker models are established. The speaker models of each pair are merged into a corresponding speaker model in the next higher layer i+1. As such, N/2 speaker models $M_1^{i+1}$ to $M_{N/2}^{i+1}$ are formed in layer i+1. These speaker models are then compared to each other to establish pairs, and then merged in the same manner to thereby define N/4 merged models in the next higher layer i+2. The tree building process continues until all the models are merged into a single speaker model $M_{FINAL}$ (root of the tree) in the top layer, i+k. The resulting tree structure, which consists of all the models in the various layers, can be used in a number of applications as will become apparent below.

The representative tree illustrated in FIG. 6 is a binary tree, in which two speaker models of a given layer are merged to create a corresponding parent. However, other types of tree structures may be formed in the alternative, as would be readily apparent to a person of ordinary skill in the art, based on the disclosure herein. In the general case, the invention is implemented with an n-ary structure in which n speaker models of each layer are merged to create a corresponding parent.

Figure 7:
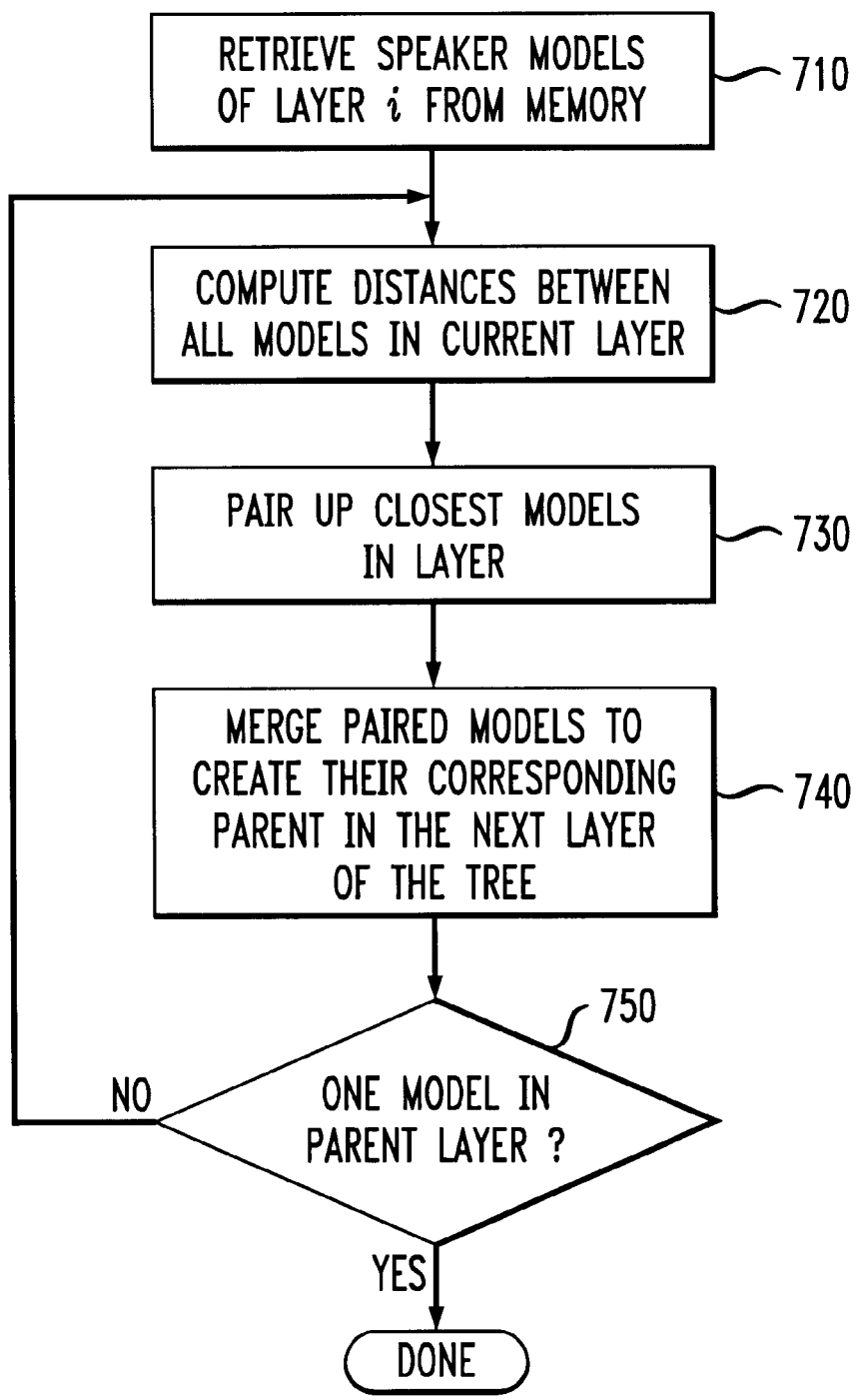
FIG. 7 is a flow diagram of an exemplary software routine for merging speaker models in a tree-like fashion.

FIG. 7 illustrates a flow diagram of an exemplary software routine for producing the speaker model tree of FIG. 6. As shown in FIG. 7, all the speaker models $M_1^i$ to $M_N^i$ in the bottommost layer i are initially retrieved from memory during step 710. Next, the distances between all speaker models in the current layer (layer i, at this point) are computed during step 720. Based upon the distance measurements, the closest speaker models in the current layer are paired up during step 730. The pairing up of the closest speaker models in the tree layer under consideration can be performed in accordance with the approach illustrated in FIG. 9, discussed below.

The paired models are merged during step 740 to create their corresponding parent in the next layer of the tree. If it is determined during step 750 that one model remains in the parent layer thus formed, the tree building process is complete; otherwise, the routine returns to step 720 to continue the merging process for subsequent parent layers.

The computation of the distances between the speaker models in step 720 may be accomplished in accordance with the method described in copending U.S. patent application Ser. No. 09/237,063, filed Jan. 26, 1999, entitled "Method for Measuring Distance Between Collections of Distributions," assigned to the assignee of the present invention. Briefly, this method of measuring the distance between two speaker models entails computing the minimum distances between individual distributions of one speaker model to those of the other speaker model. The total distance between speaker models is approximately a weighted sum of those minimum distances.

The distance measurement method is illustrated in more detail with reference to FIGS. 8A and 8B, wherein it is desired to measure the distance between speaker models A and B. Speaker model A consists of a collection of M Gaussian distributions $A_1-A_M$ derived from a speech segment of speaker A; speaker model B consists of N Gaussians $B_1-B_N$ derived from a speech segment of speaker B. A matrix of distances between the individual distributions of the two speaker models is computed. In FIG. 8A, the matrix consists of distances d11 to dMN measured from the distributions of model A to those in model B. For example, distance d21 is the distance from distribution $A_2$ to $B_1$. In FIG. 8B, the matrix is comprised of distances d11' to dMN' which are measured from the distributions in speaker model B to those in model A. Thus, distance d21' is the distance from distribution $B_1$ to $A_2$. (In some instances, the distances between two distributions in opposite directions may differ.) These "inter-distribution" distances of the matrix are computed using a conventional algorithm, e.g., the Euclidean, Mahalonobis or Kullback-Leibler algorithms.

As shown in FIG. 8A, an array of weighted row minima $W_1^A$ to $W_M^A$ is established by first finding the minimum distance in each row. This minimum distance is multiplied by the counts (number of samples) for the cluster corresponding to the A distribution to arrive at the weighted row minima $W_i^A$ for row i (i=1 to M). Thus, if the counts for distribution $A_i$ are designated $c_i^A$, then, $$W_i^A = (c_i^A)(diy) \tag{1}$$

where diy is the minimum distance in row i (distance between distributions $A_i$ and $B_y$).

Similarly, as shown in FIG. 8B, for each column j (j=1 to N), the minimum distance dxj' is computed (i.e., the distance from $B_j$ to $A_x$). Weighted column minimum $W_j^B$ for each column j is then determined from:

$$W_j^B = c_j^B (dxj') \tag{2}$$

where $c_j^B$ denotes the counts for the cluster corresponding to distribution $B_j$.

With weighted row minima $W_1^A-W_M^A$ and column minima $W_1^B$ to $W_N^B$ thus computed and stored in memory, the distance $D_{AB}$ between speaker models A and B is computed in accordance with eqn. (3):

$$D_{AB} = \frac{\sum_{i=1}^{M} W_i^A + \sum_{j=1}^{N} W_j^B}{\sum_{i=1}^{M} c_i^A + \sum_{j=1}^{N} c_j^B}$$

Figure 9:
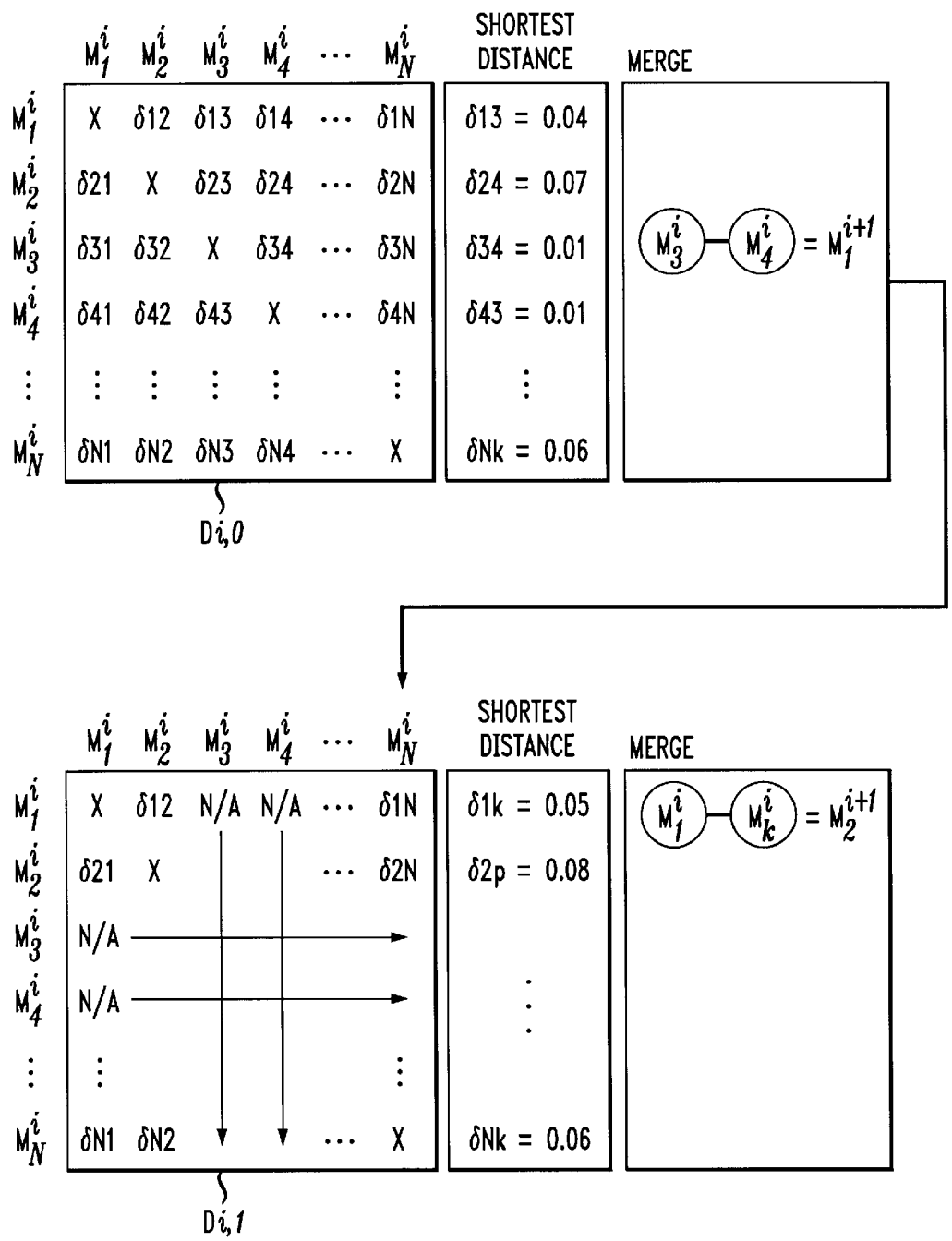
FIG. 9 illustrates a speaker model pairing method.

As indicated above in conjunction with FIG. 7, the pairing up of the closest speaker models in the tree layer under consideration can be performed during step 730 in accordance with the approach illustrated in FIG. 9. A N×N distance matrix $D_{i,0}$ for the N speaker models in layer i is first established. The distance values therein represent the distances between speaker models, which may be computed in accordance with eqn. (3) or via some other inter-model distance measure. Preferably, the distance measure of eqn. (3) is used because this approach is orders of magnitude faster than a traditional Maximum Likelihood approach. In FIG. 9, distance δ21 is the distance from speaker model $M_2^i$ to model $M_1^i$; distance δ12 is the distance from model $M_1^i$ to model $M_2^i$; and so forth. To establish pairs of speaker models in row i to be merged into a corresponding parent in the next layer i+1, the distances within each row are compared to determine which is the shortest. The shortest distance overall is then used to establish one pair of speaker models. In the example shown, distance δ13 is the shortest in row 1; δ24 is the shortest in row 2; and so on. Since the shortest distance overall is between models $M_3^i$ and $M_4^i$, these models are merged to form the first merged model of the next layer, $M_1^{i+1}$. Additional pairs in layer i are then formed in the same manner, excluding models that have already been paired up. Thus, in the example, matrix $D_{i,1}$ is next considered, which is the same as $D_{i,0}$ except that models $M_3^i$ and $M_4^i$ are excluded. The shortest row distances are again determined to establish the next pair of models to be merged, in this case $M_1^i$ and $M_k^i$ to form parent model $M_2^{i+1}$. The process continues until all models in layer i are paired up. If the number N of speaker models in layer i is odd, the remaining model in that layer may be merged with the members of the next generation (level) in the tree.

As each level of the tree is created, the new models in that generation are treated as new speaker models containing their two children, and the pairing/merging process is continued layer by layer until one root model is reached at the top of the tree. Thus, using the technique of FIG. 9, after parent models $M_1^{i+1}$ to $M_{N/2}^{i+1}$ are derived, a new distance matrix $D_{i+1,0}$ (not shown) is formed containing the distances between the models of layer i+1, then distance matrix $D_{i+1,1}$, etc. The process is repeated until the top layer is reached.

Figure 10:
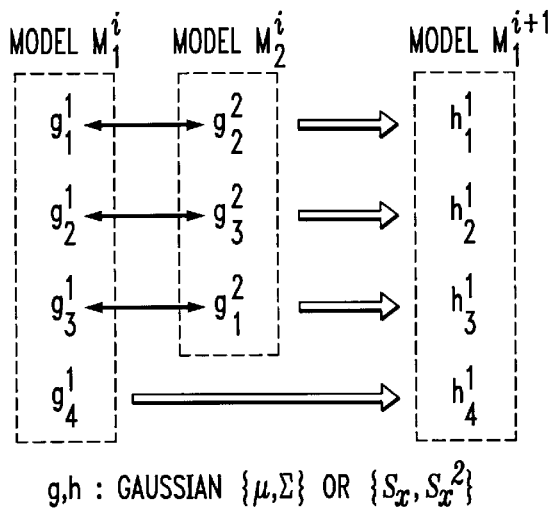
FIG. 10 illustrates a speaker model merging process.

FIG. 10 illustrates an exemplary approach to the speaker model merging operation performed during step 740 (FIG. 7). In the example, speaker model $M_1^i$ (of layer i) which contains four distributions $g_1^1$ to $g_4^1$, is to be merged with speaker model $M_2^i$ containing three distributions $g_1^2$ to $g_3^2$ (where the superscripts of the distributions denote the model association). The inter-distribution distances between the two models are measured using a conventional distance measure to determine which are closest, whereby distribution pairs are established. The pairs are then merged to form a corresponding distribution in the parent model. For instance, in the example, distribution $g_1^1$ is determined to be closest to $g_2^2$, so these are merged to form distribution $h_1^1$ of the resulting parent model $M_1^{i+1}$ in layer i+1. Note that in this example the "children" $M_1^i$, $M_2^i$ contain a different number of distributions. In this case, the leftover distribution $g_4^1$ simply becomes the last distribution, $h_4^1$, of the parent model.

The merging of distribution pairs may be implemented by some type of averaging of the respective statistical parameters, e.g., averaging $\mu$, $\Sigma$ in the case of two Gaussian distributions. As an alternative, the merging can be accomplished by summing the actual feature data of the respective distributions. Either the first or second order sums of the feature data, $S_x$ and $S_x^2$, respectively, may be used. These parameters, along with the counts, would be used as an alternative set of parameters defining the Gaussian distributions of interest.

Processes

Figure 11:
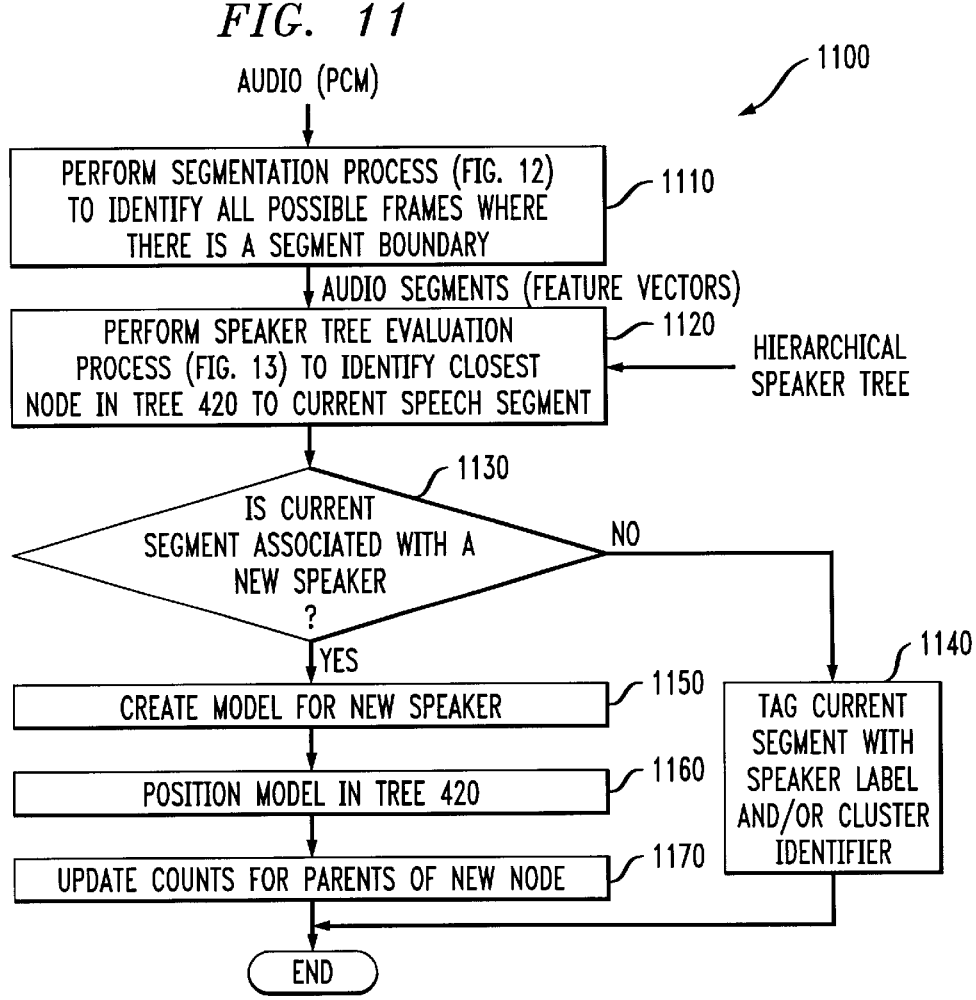
FIG. 11 is a flow chart describing an exemplary speaker identification process performed by the unknown speaker classification system of FIG. 1.

As previously indicated, the speaker identification process 1100, shown in FIG. 11, analyzes one or more audio files in the audio corpus database 150 and produces a transcription of the audio information in real-time, that indicates the name of the speaker associated with each segment, if available, or provides a generic label associated with a background model. Thereafter, the user can be prompted to assign a speaker name to an unknown speaker, if desired.

As discussed below, once the speech segments are identified by the segmentation process 1200, the speaker tree evaluation process 1300 compares the segment utterances to the hierarchical enrolled speaker database 420 and finds the "closest" speaker, if any, to assign a speaker label to each identified segment. A speech segment having an unknown speaker is initially assigned a general speaker label from a set of background models for speaker identification, such as "unenrolled male" or "unenrolled female." The "unenrolled" segment is assigned a segment number and receives a cluster identifier. Thus, a unique cluster identifier is assigned for each speaker to further differentiate the general speaker labels.

As shown in FIG. 11, the speaker identification process 1100 initially performs a speaker segmentation process 1200, discussed further below in conjunction with FIG. 12 during step 1110. Generally, the segmentation process 1200 separates the speakers and identifies all possible frames where there is a segment boundary between non-homogeneous speech portions. Each frame where there is a segment boundary is referred to as a turn and each homogeneous segment should correspond to the speech of a single speaker. Once delineated by the segmentation process 1200, each segment can be classified as having been spoken by a particular speaker (assuming the segment meets the minimum segment length requirement required for the speaker recognition system).

The turns identified by the segmentation process 1200, together with the speaker models generated in the hierarchical tree structure 420, discussed above, are then processed during step 1120 using a speaker tree evaluation process 1300, discussed below in conjunction with FIG. 13, to identify the closest node in the hierarchical tree structure 420 to the current speech segment. Generally, a new speaker is identified for the current speech segment by the speaker tree evaluation process 1300 when the current segment matches the background model better than any of the speakers in the hierarchical tree structure 420, or the score fails to meet a predefined acceptance threshold for any enrolled speaker.

A test is performed during step 1130 to determine if the current segment is associated with a new speaker. If it is determined during step 1130 that the current segment is not associated with a new speaker, then the speech segment is tagged during step 1140 with the proper speaker label and/or cluster identifier. If, however, it is determined during step 1130 that the current segment is associated with a new speaker, then a new model is created for the speaker during step 1150 and the created model is positioned in the tree 420 during step 1160 next to the identified closest node. In addition, the counts of the parent nodes are updated during step 1170 based on the new statistics, in the manner described above.

The user may be prompted for the identity of an unknown speaker associated with a given audio segment in real-time or in an off-line. In a real-time implementation, the user can be prompted as the speaker identification labels are appended to the transcribed text. In an off-line implementation, the user can be prompted for the identity of an unknown speaker associated with a given cluster, once the complete audio file has been played. For example, the user can select a segment from among the segments in each cluster and thereafter indicate the corresponding speaker.

The speaker names provided by the user can be used to update the speaker turn database 300 and the hierarchical enrolled speaker database 420. In this manner, once the user assigns a speaker label to an audio segment having an unknown speaker in a real-time implementation, the same speaker name is automatically assigned to any segments that are assigned to the same cluster. Likewise, once the user assigns a speaker label to a cluster having an unknown speaker in an off-line implementation, the present invention will automatically assign the speaker name to all segments associated with the cluster.

The enrolled speaker database 420 is updated with a newly identified speaker by collecting the segments associated with the given speaker and using the segments as speaker training files, in the manner discussed above in conjunction with FIG. 11.

Speaker Segmentation

Figure 12:
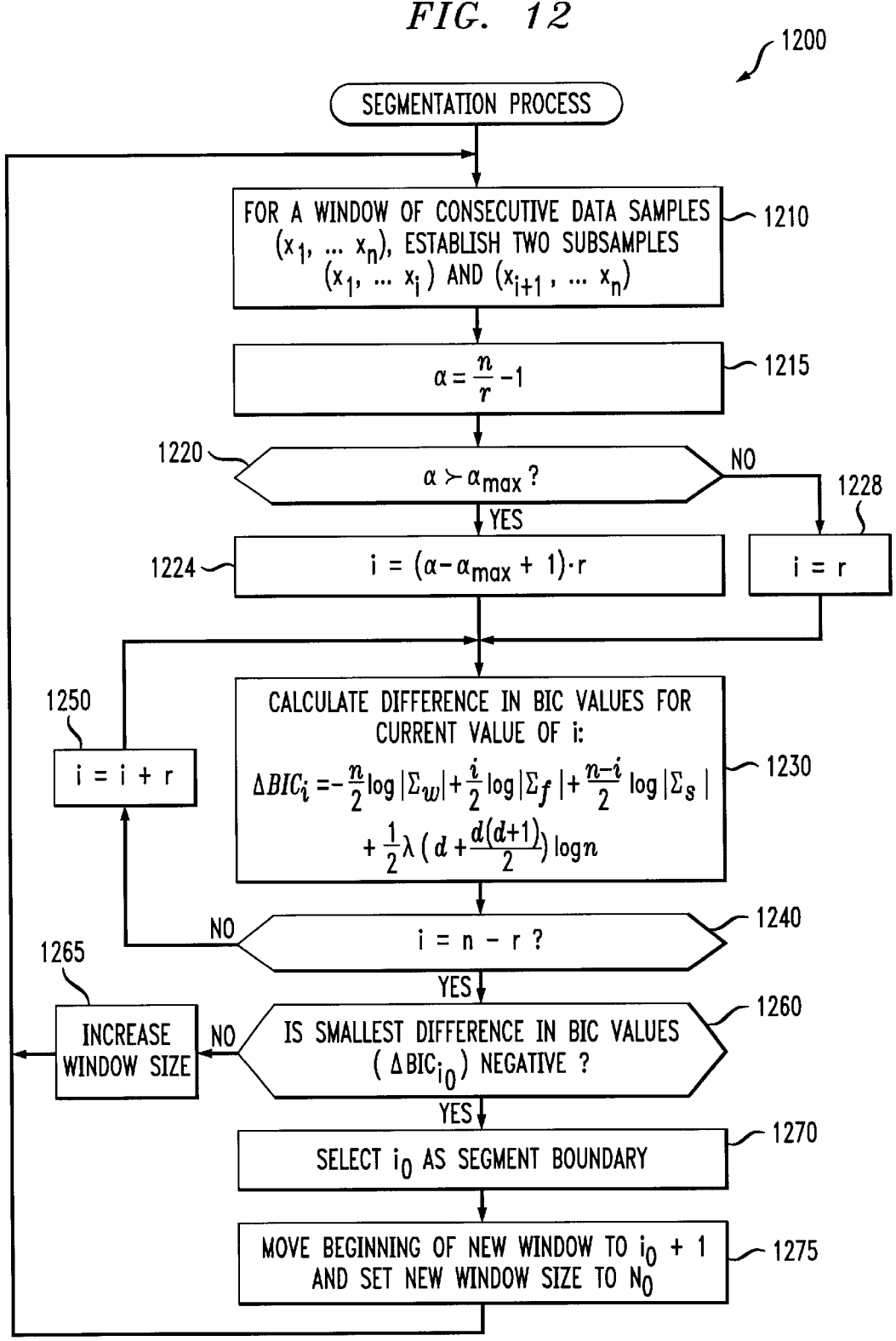
FIG. 12 is a flow chart describing an exemplary segmentation process performed by the unknown speaker classification system of FIG. 1.

The illustrative segmentation process 1200, shown in FIG. 12, identifies all possible frames where there is a segment boundary. Without loss of generality, consider a window of consecutive data samples ($x_1, \ldots x_n$) in which there is at most one segment boundary. The basic question of whether or not there is a segment boundary at frame i can be cast as a model selection problem between the following two models: model $M_1$, where $(x_1, \ldots x_n)$ is drawn from a single full-covariance Gaussian, and model $M_2$, where $(x_1, \ldots x_n)$ is drawn from two full-covariance Gaussians, with $(x_1, \ldots x_i)$ drawn from the first Gaussian, and $(x_{i+1}, \ldots x_n)$ drawn from the second Gaussian.

Since $X_i \in R^d$, model $M_1$ has $$k_1 = d + \frac{d(d+1)}{2}$$

parameters, while model $M_2$ has twice as many parameters ($k_2 = 2k_1$). It can be shown that the $i^{th}$ frame is a good candidate for a segment boundary if the expression:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

is negative, where $|\Sigma_w|$ is the determinant of the covariance of the whole window (i.e., all n frames), $|\Sigma_f|$ is the determinant of the covariance of the first subdivision of the window, and $|\Sigma_s|$ is the determinant of the covariance of the second subdivision of the window.

Thus, two subsamples, $(x_1, \ldots x_i)$ and $(x_{i+1}, \ldots x_n)$, are established during step 1210 from the window of consecutive data samples $(x_1, \ldots x_n)$. The segmentation process 1200 performs a number of tests during steps 1215 through 1228 to eliminate some BIC tests in the window, when they correspond to locations where the detection of a boundary is very unlikely. Specifically, the value of a variable $\alpha$ is initialized during step 1215 to a value of n/r−1, where r is the detection resolution (in frames). Thereafter, a test is performed during step 1220 to determine if the value $\alpha$ exceeds a maximum value, $\alpha_{max}$. If it is determined during step 1220 that the value $\alpha$ exceeds a maximum value, $\alpha_{max}$, then the counter i is set to a value of $(\alpha - \alpha_{max} + 1)r$ during step 1224. If, however, it is determined during step 1220 that the value $\alpha$ does not exceed a maximum value, $\alpha_{max}$, then the counter i is set to a value of r during step 1228. Thereafter, the difference in BIC values is calculated during step 1230 using the equation set forth above.

A test is performed during step 1240 to determine if the value of i equals n−r. In other words, have all possible samples in the window been evaluated. If it is determined during step 1240 that the value of i does not yet equal n−r, then the value of i is incremented by r during step 1250 to continue processing for the next sample in the window at step 1230. If, however, it is determined during step 1240 that the value of i equals n−r, then a further test is performed during step 1260 to determine if the smallest difference in BIC values ($\Delta BIC_{i0}$) is negative. If it is determined during step 1260 that the smallest difference in BIC values is not negative, then the window size is increased during step 1265 before returning to step 1210 to consider a new window in the manner described above. Thus, the window size, n, is only increased when the $\Delta BIC$ values for all i in one window have been computed and none of them leads to a negative $\Delta BIC$ value.

If, however, it is determined during step 1260 that the smallest difference in BIC values is negative, then $i_0$ is selected as a segment boundary during step 1270. Thereafter, the beginning of the new window is moved to $i_0 + 1$ and the window size is set to $N_0$ during step 1275, before program control returns to step 610 to consider the new window in the manner described above.

Thus, the BIC difference test is applied for all possible values of i, and $i_0$ is selected with the most negative $\Delta BIC_i$.

A segment boundary can be detected in the window at frame i: if $\Delta BIC_{i0} < 0$, then $x_{i0}$ corresponds to a segment boundary. If the test fails then more data samples are added to the current window (by increasing the parameter n) during step 1260, in a manner described below, and the process is repeated with this new window of data samples until all the feature vectors have been segmented. Generally, the window size is extended by a number of feature vectors, which itself increases from one window extension to another. However, a window is never extended by a number of feature vectors larger than some maximum value. When a segment boundary is found during step 1270, the window extension value retrieves its minimal value ($N_0$).

The BIC formula utilizes a penalty weight parameter, $\lambda$, in order to compensate for the differences between the theory and the practical application of the criterion. It has been found that the best value of $\lambda$ that gives a good tradeoff between miss rate and false-alarm rate is 1.3. For a more comprehensive study of the effect of $\lambda$ on the segmentation accuracy for the transcription of broadcast news, see, A. Tritschler, "A Segmentation-Enabled Speech Recognition Application Using the BIC," M. S. Thesis, Institut Eurecom (France, 1998), incorporated by reference herein.

While in principle the factor $\lambda$ is task-dependent and has to be retuned for every new task, in practice the algorithm has been applied to different types of data and there is no appreciable change in performance by using the same value of $\lambda$.

Speaker Tree Evaluation

Figure 13:
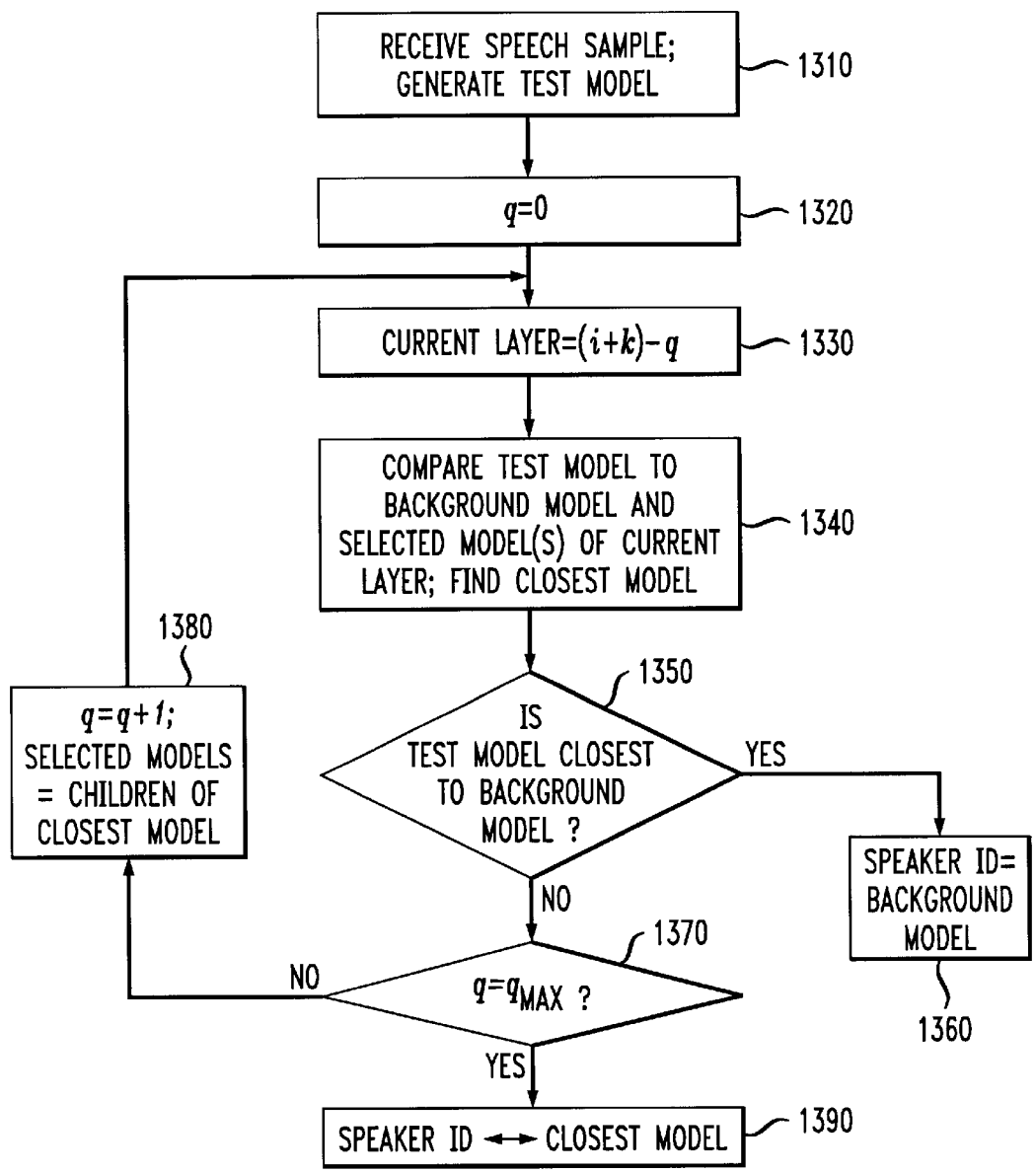
FIG. 13 is a flow chart describing an exemplary speaker tree evaluation process performed by the unknown speaker classification system of FIG. 1.

As previously indicated, the speaker tree evaluation process 1300, shown in FIG. 13, compares a given speech segment to the hierarchical speaker tree 420 and identifies the closest node. The flow diagram of FIG. 13 illustrates a top down sweep approach to performing speaker identification using a pre-computed speaker model tree. As shown in FIG. 13, the speaker tree evaluation process 1300 initially receives a speech sample of the unknown speaker during step 1310 and a test model containing a collection of distributions is generated therefrom in the same manner described above. A variable q, that identifies levels of the tree, is set to zero during step 1320. The current tree layer under consideration is set to (i+k)−q during step 1330, where layer (i+k) denotes the top layer (root layer) of the tree. Thereafter, during step 1340, the test model is compared to both a background model and to selected model(s) of the current layer to determine which is closer.

Since the root layer has only one model, $M_{FINAL}$, it becomes the initial selected model. If it is determined that the closest model to the test model is the background model in step 1350, then the current speaker is associated with the background model of an unknown speaker during step 1360.

If, however, it is determined that the closest model to the test model is not the background model during step 1350, then a further test is performed during step 1370 to determine if the variable q is less than a predetermined maximum $q_{MAX}$. If it is determined during step 1370 that the variable q is still less than a predetermined maximum $q_{MAX}$, then q is incremented during step 1380, and the new selected models are set to the children of the closest model that was just determined in step 1350.

For example, as shown in FIG. 6, the children of model $M_{FINAL}$ are both models in the next lower layer. As the process continues, the routine "travels down" the tree by continuing to select the closest speaker model in each layer, until the lowest layer is reached. At this point, $q=q_{MAX}$ and the speaker is identified as that speaker corresponding to the latest closest model, i.e., the closest model to the test model in the leaf layer. Accordingly, for this embodiment (which corresponds to a binary tree), a distance measure is made between the test model and only two speaker models in each layer. (In the general case of an n-ary tree, the test model is compared to n speaker models in each layer.)

It is to be understood that the embodiments and variations shown and described herein are merely illustrative of the principles of this invention and that various modifications may be implemented by those skilled in the art without departing from the scope and spirit of the invention.

What is claimed is:

1. A method for identifying a speaker in an audio source, said method comprising the steps of:

generating a plurality of speaker models each corresponding to a different speaker, said speaker models including at least one background model corresponding to an unenrolled speaker, said speaker models containing a collection of distributions of audio feature data associated with that speaker;

merging similar speaker models on a layer by layer basis so as to generate a hierarchical speaker model tree;

identifying potential segment boundaries in said audio source; and assigning a speaker label to each identified segment, said speaker label being selected by comparing said identified segment to said speaker models.

2. The method of claim 1, wherein said assigning step further comprises the step of assigning a score indicating the confidence of said assigned speaker label.

3. The method of claim 1, further comprising the step of prompting a user for a name of an unenrolled speaker.

4. The method of claim 1, wherein said hierarchical speaker model tree includes a plurality of nodes and said method further comprising the step of assigning an identity to each of said nodes.

5. The method of claim 1, wherein said hierarchical speaker model tree includes a plurality of nodes and said method further comprising the step of using segments associated with the same node as speaker training files to update said wherein said hierarchical speaker model tree with said unenrolled speaker.

6. A system for identifying a speaker in an audio source, comprising:

a memory that stores computer-readable code; and a processor operatively coupled to said memory, said processor configured to implement said computer-readable code, said computer-readable code configured to:

generate a plurality of speaker models each corresponding to a different speaker, said speaker models including at least one background model corresponding to an unenrolled speaker, said speaker models containing a collection of distributions of audio feature data associated with that speaker;

merge similar speaker models on a layer by layer basis so as to generate a hierarchical speaker model tree;

identify potential segment boundaries in said audio source; and assign a speaker label to each identified segment, said speaker label being selected by comparing said identified segment to said speaker models.

7. The system of claim 6, wherein said processor is further configured to assign a score indicating the confidence of said assigned speaker label.

8. The system of claim 6, wherein said processor is further configured to prompt a user for a name of an unenrolled speaker.

9. The system of claim 6, wherein said hierarchical speaker model tree includes a plurality of nodes and wherein said processor is further configured to assign an identity to each of said nodes.

10. The system of claim 6, wherein said hierarchical speaker model tree includes a plurality of nodes and wherein said processor is further configured to use segments associated with the same node as speaker training files to update said wherein said hierarchical speaker model tree with said unenrolled speaker.

11. An article of manufacture, comprising:

a computer readable medium having computer readable code means embodied thereon, said computer readable program code means comprising:

a step to generate a plurality of speaker models each corresponding to a different speaker, said speaker models including at least one background model corresponding to an unenrolled speaker, said speaker models containing a collection of distributions of audio feature data associated with that speaker;

merge similar speaker models on a layer by layer basis so as to generate a hierarchical speaker model tree;

identify potential segment boundaries in said audio source; and assign a speaker label to each identified segment, said speaker label being selected by comparing said identified segment to said speaker models.

12. A method for identifying a speaker in an audio source, said method comprising the steps of:

generating a plurality of speaker models each corresponding to a different speaker, said speaker models including at least one background model corresponding to an unenrolled speaker, said speaker models containing a collection of distributions of audio feature data associated with that speaker;

merging similar speaker models on a layer by layer basis so as to generate a hierarchical speaker model tree;

identifying potential segment boundaries in said audio source;

assigning a speaker label to each identified segment, said speaker label being selected by comparing said identified segment to said speaker models;

presenting said user with said assigned speaker labels; and prompting a user for an identity of an unenrolled speaker.

13. The method of claim 12, wherein said assigning step further comprises the step of assigning a score indicating the confidence of said assigned speaker label.

14. The method of claim 12, wherein said hierarchical speaker model tree includes a plurality of nodes and said method further comprising the step of assigning an identity to each of said nodes.

15. The method of claim 12, wherein said hierarchical speaker model tree includes a plurality of nodes and said method further comprising the step of using segments associated with the same node as speaker training files to update said wherein said hierarchical speaker model tree with said unenrolled speaker.

16. A system for identifying a speaker in an audio source, comprising:

a memory that stores computer-readable code; and a processor operatively coupled to said memory, said processor configured to implement said computer-readable code, said computer-readable code configured to:

generate a plurality of speaker models each corresponding to a different speaker, said speaker models including at least one background model corresponding to an unenrolled speaker, said speaker models containing a collection of distributions of audio feature data associated with that speaker;

merge similar speaker models on a layer by layer basis so as to generate a hierarchical speaker model tree;

identify potential segment boundaries in said audio source;

assign a speaker label to each identified segment, said speaker label being selected by comparing said identified segment to said speaker models;

present said user with said assigned speaker labels; and prompt a user for an identity of an unenrolled speaker.

17. The system of claim 16, wherein said processor is further configured to assign a score indicating the confidence of said assigned speaker label.

18. The system of claim 16, wherein said hierarchical speaker model tree includes a plurality of nodes and wherein said processor is further configured to assign an identity to each of said nodes.

19. The system of claim 16, wherein said hierarchical speaker model tree includes a plurality of nodes and wherein said processor is further configured to use segments associated with the same node as speaker training files to update said wherein said hierarchical speaker model tree with said unenrolled speaker.

20. An article of manufacture, comprising:

a computer readable medium having computer readable code means embodied thereon, said computer readable program code means comprising:

a step to generate a plurality of speaker models each corresponding to a different speaker, said speaker models including at least one background model corresponding to an unenrolled speaker, said speaker models containing a collection of distributions of audio feature data associated with that speaker;

a step to merge similar speaker models on a layer by layer basis so as to generate a hierarchical speaker model tree;

a step to identify potential segment boundaries in said audio source;

a step to assign a speaker label to each identified segment, said speaker label being selected by comparing said identified segment to said speaker models;

a step to present said user with said assigned speaker labels; and a step to prompt a user for an identity of an unenrolled speaker.

* * * * *